US012747790B2

(12) United States Patent
Zhang

(10) Patent No.: US 12,747,790 B2
(45) Date of Patent: Sep. 29, 2026

(54) SEALING RING FOR PRESS-FITTING CONNECTION STRUCTURE

(71) Applicant: NINGBO PUREY FLOW TECHNOLOGY CO., LTD., Ningbo (CN)

(72) Inventor: Qihao Zhang, Ningbo (CN)

(73) Assignee: NINGBO PUREY FLOW TECHNOLOGY CO., LTD., Ningbo (CN)

( * ) Notice: Subject to any disclaimer, the term of this patent is extended or adjusted under 35 U.S.C. 154(b) by 0 days.

(21) Appl. No.: 18/633,552

(22) Filed: Apr. 12, 2024

(65) Prior Publication Data

US 2024/0344610 A1 Oct. 17, 2024

(30) Foreign Application Priority Data

Apr. 12, 2023 (CN) ......................... 202320800194.8

(51) Int. Cl.
*F16J 15/10* (2006.01)
*F16J 15/02* (2006.01)

(52) U.S. Cl.
CPC ........... *F16J 15/104* (2013.01); *F16J 15/024* (2013.01)

(58) Field of Classification Search
CPC ..... F16L 13/142; F16L 13/143; F16L 13/148; F16L 21/02; F16L 21/03; F16L 47/08; F16J 15/022; F16J 15/024; F16J 15/061; F16J 15/064; F16J 15/104
See application file for complete search history.

(56) References Cited

U.S. PATENT DOCUMENTS

| | | | | |
|---|---|---|---|---|
| 856,106 A * | 6/1907 | Snow | F16L 17/035 | 277/626 |
| 6,260,891 B1 * | 7/2001 | Foering | F16L 13/148 | 285/918 |
| 7,475,918 B2 * | 1/2009 | Kaimer | F16L 13/148 | 277/626 |
| 7,823,932 B2 * | 11/2010 | Webb | F16L 13/148 | 285/345 |
| 9,816,645 B2 * | 11/2017 | Duval-Arnould | F16J 15/3232 | |
| 11,982,380 B2 * | 5/2024 | Lee | F16L 21/03 | |
| 12,060,954 B2 * | 8/2024 | Stogdill | F16L 13/148 | |
| 2004/0056429 A1 * | 3/2004 | Okazaki | F16J 15/061 | 277/627 |

(Continued)

FOREIGN PATENT DOCUMENTS

| | | | | |
|---|---|---|---|---|
| CN | 201953992 U | 8/2011 | | |
| EP | 1555473 A1 * | 7/2005 | F16J 15/064 | |

(Continued)

*Primary Examiner* — Nicholas L Foster

(57) ABSTRACT

Disclosed is a sealing ring for press-fitting connection structure, which includes a sealing ring body being annular-shaped. The sealing ring body includes an inner curved wall and an outer curved wall. At least one notch is provided and formed axially on the inner curved wall of the sealing ring body, and convex structures are provided at two lateral sides of the notch. By means of setting at least one notch in the inner arc-shaped wall of the sealing ring body, it serves as a gap between the sealing ring and the pipe for fluid to pass therethrough, achieving the purpose of warning the leakage of the press-fitting connection structure and avoiding potential use hazards in the future.

11 Claims, 5 Drawing Sheets

(56) References Cited

U.S. PATENT DOCUMENTS

| | | | | |
|---|---|---|---|---|
| 2006/0175829 | A1* | 8/2006 | Kaimer | F16L 13/142<br>285/256 |
| 2007/0246938 | A1* | 10/2007 | Webb | F16L 13/148<br>285/345 |
| 2010/0084827 | A1* | 4/2010 | Peddle | F16J 15/061<br>277/644 |
| 2010/0148495 | A1* | 6/2010 | Glaze | F16L 13/142<br>285/344 |
| 2011/0285094 | A1* | 11/2011 | Henry | F16L 13/142<br>277/626 |
| 2017/0102101 | A1* | 4/2017 | Duval-Arnould | F16J 15/3232 |
| 2021/0247003 | A1* | 8/2021 | Stogdill | F16L 21/03 |

FOREIGN PATENT DOCUMENTS

| | | | | |
|---|---|---|---|---|
| EP | 2357389 | A1 * | 8/2011 | F16J 15/106 |
| EP | 2497976 | A1 * | 9/2012 | F16J 15/064 |

* cited by examiner

SEALING RING FOR PRESS-FITTING CONNECTION STRUCTURE

CROSS-REFERENCE TO RELATED APPLICATIONS

This application claims priority to Chinese Patent Application No. 202320800194.8 filed on Apr. 12, 2023, the entire contents of which are hereby incorporated by reference.

TECHNICAL FIELD

This application relates to the technical field of pipeline connection, and in particular to a sealing ring for press-fitting connection structure.

BACKGROUND

Press-fitting connection is a process of inserting an end portion of a pipe into a press-fitting connection structure, which includes press-fitting joints, pipe clamps, etc. A sealing ring is provided inside the press-fitting connection structure, and a press-fitting tool is used to clamp the pipe and the press-fitting joint to deform and connect, so as to make the sealing ring deform and become more tightly attached to the pipe under force, thereby the press-fitting connection structure and the pipe being connected tightly. In large-scale pipeline engineering, there are many pipes that need to be press-fitted and connected, and the workload is large. Workers are prone to missing some of the press-fitting operations between the pipes and press-fitting connection structures. However, due to the presence of the sealing ring, there is still a certain degree of sealing even if press-fitting operation is missed. Therefore, a leakage location cannot be accurately identified during pressure testing of the pipeline system, which poses a potential danger for use.

For the above issues, CN 201953992U discloses an O-ring for stainless steel pipe, which is annular-shaped. An inside radial surface and an outside radial surface are respectively provided with at least one protrusion which is machined in the radial direction. The O-ring for the stainless steel pipe is made of elastic materials, such as Polytetrafluoroethylene. In this technical solution, by means of machining protrusions on the inner and outer radial surfaces of the O-ring, there are gaps among contact surfaces of the pipe fitting, O-ring, and water pipes without press-fitting, and thus water leakage can be detected during pressure testing to indicate the location where pipe fitting is missed to the worker. However, the protrusions on the O-ring do not have suitable deformation space when compressed, which can cause inadequate sealing. Therefore, there is a need for a sealing ring that can detect and prompt for missing of press-fitting operation for the pipe and press-fitting connection structure, without affecting the sealing effect.

SUMMARY

A technical problem to be solved by this application is to provide a sealing ring for press-fitting connection structure, which can detect and prompt whether a press-fitting operation for the press-fitting connection structure and pipe is missed before use, and has a good sealing effect after press-fitting operation.

This application provides a sealing ring for press-fitting connection structure, including a sealing ring body which is annular-shaped. The sealing ring body includes an inner curved wall and an outer curved wall. At least one notch is provided and formed axially on the inner curved wall of the sealing ring body, and convex structures are provided at two lateral sides of the notch.

In this technical solution, the sealing ring is mainly installed inside the press-fitting connection structure, which may be a press-fitting joint, a pipe clamp, and etc. An end portion of the pipe is inserted into the press-fitting connection structure and then connected by a press-fitting tool. By means of setting the sealing ring body to include opposite inner curved wall and outer curved wall, the sealing ring body is attached to an inner wall of the press-fitting connection structure through its outer curved wall, and is attached to an outer wall of the pipe through its inner curved wall. By means of setting at least one notch on the inner curved wall of the sealing ring body, the notch is formed axially on the inner curved wall of the sealing ring body and serves as a gap between the sealing ring and the pipe for fluid to pass through. When the press-fitting connection structure and the pipe are not press-fitted, the fluid will leak through the notch during a detection process, so as to achieve the purpose of warning of leakage, timely remind the testing person and perform press-fitting operation on the press-fitting connection structure at the leakage position, thereby avoiding potential safety hazards in the future. By means of setting convex structures at two lateral sides of the notch, the sealing ring deforms under force and fits with the pipe when the press-fitting connection structure is press-fitted with the pipe, the convex structures deform under force to fill the notch, thereby improving a scaling performance of the sealing ring, resulting in better sealing effect of the press-fitting connection structure after the press-fitting operation.

Further, the inner curved wall and the outer curved wall are joined to make a cross-section of the scaling ring body be diamond-shaped.

In this technical solution, the press-fitting connection structure and the pipe are both tubular structures, and the inner curved wall and the outer curved wall of the sealing ring body both are arc-shaped structures, the sealing ring body fits better with the inner wall of the press-fitting connection structure through the outer curved wall of the curved structures, and fits better with the outer wall of the pipe through the inner curved wall 11 of the curved structures. By means of setting the cross section of the sealing ring body in a diamond shape through a joint of the inner curved wall and the outer curved wall, an area of the deformed sealing ring attached to the outer wall of the pipe is larger, improving the sealing performance, bearing capacity, and reliability of the sealing ring.

Further, a transition portion is provided between the inner curved wall and the outer curved wall, and the inner curved wall is joined to the outer curved wall through the transition portion.

In this technical solution, by means of providing a transition portion between the inner curved wall and the outer curved wall, a contact area of the sealing ring attached to the outer wall of the pipe can be increased through deformation of the transition portion when the sealing ring is subjected to force, which improves the sealing performance, bearing capacity, and reliability of the scaling ring.

Further, a width of the inner curved wall is greater than a width of the outer curved wall.

In this technical solution, the sealing ring body is attached to the outer wall of the pipe through the inner curved wall. By means of setting the inner curved wall with a wider width, a contact area of the deformed sealing ring attached to the outer wall of the pipe can be larger, so as to improve the sealing effect between the press-fitting connection structure and the pipe after press-fitting.

Further, the convex structure is a protrusion set on the inner curved wall of the sealing ring body.

In this technical solution, the protrusion is provided on the inner curved wall of the sealing ring body, which makes the outer curved wall of the sealing ring body be a smooth surface. The sealing ring body fits better with the inner wall of the press-fitting connection structure through the smooth outer curved wall, resulting in a better sealing effect of the press-fitting connection structure after press-fitting.

Further, the convex structure is a convex ring arranged around an outer surface of the sealing ring body along a circumferential direction.

In this technical solution, the convex structure 13 may be convex ring on the sealing ring body, which is simple in construction and a production cost thereof is low.

Further, the notch at the inner curved wall of the sealing ring body is elliptical-shaped.

In this technical solution, the notch is set to be elliptical-shaped to adapt to the outer wall of the pipe, so that the deformed notch fits better with the outer wall of the pipe after press-fitting, which will not affect the sealing performance.

Further, the notches are four in number and the protrusions are eight in number.

In this technical solution, by means of setting four notches, the fluid can leak faster from the notch of the press-fitting connection structure without press-fitting during press-fitting detection, so as to timely remind the detection person to perform a press-fitting operation on this press-fitting connection structure. By means of setting eight convex structures, they can fill the four notches during press-fitting, improving sealing performance.

The present application discloses a sealing ring for press-fitting connection structure is achieved by setting at least one notch on an inner curved wall of the sealing ring body, which serves as a gap between the sealing ring and the pipe for fluid to pass therethrough, achieving the purpose of warning the leakage of the press-fitting connection structure and avoiding potential use hazards in the future. By means of setting the cross section of the sealing ring body in a diamond shape, an area of the deformed sealing ring attached to the outer wall of the pipe is larger, improving the sealing performance, bearing capacity, and reliability of the sealing ring.

BRIEF DESCRIPTION OF THE DRAWINGS

In order to illustrate embodiments of this application or the technical solutions in the prior art more clearly, drawings that need to be used in the description of the embodiments or the prior art will be briefly described below. It is obvious that the drawings described below are only some embodiments of this application. For those skilled in the art, other drawings can be obtained based on these drawings without any creative work.

In the figures.

Figure 1:
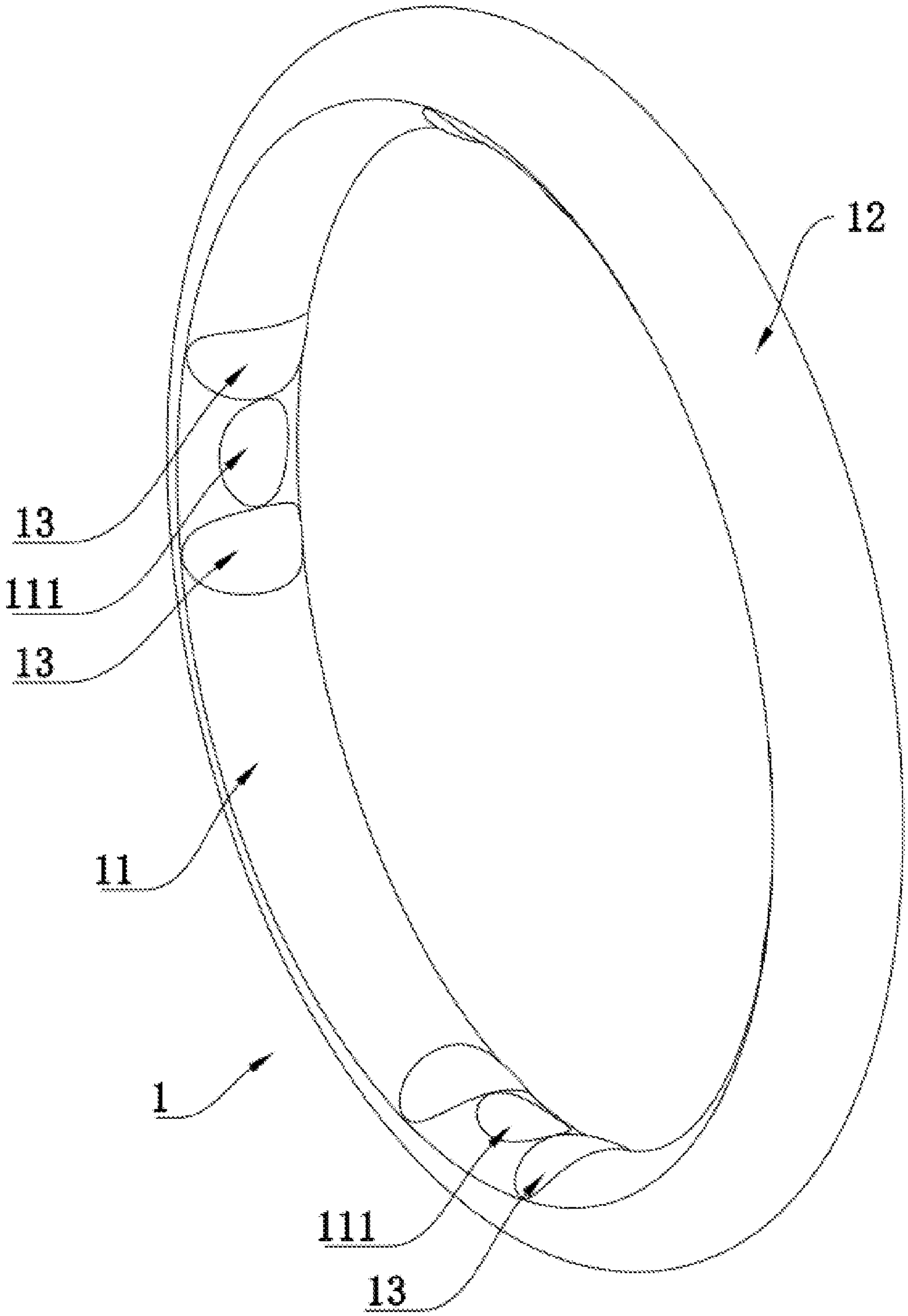
FIG. 1 is a schematic view of a sealing ring for press-fitting connection structure provided by an embodiment of this application.
Figure 2:
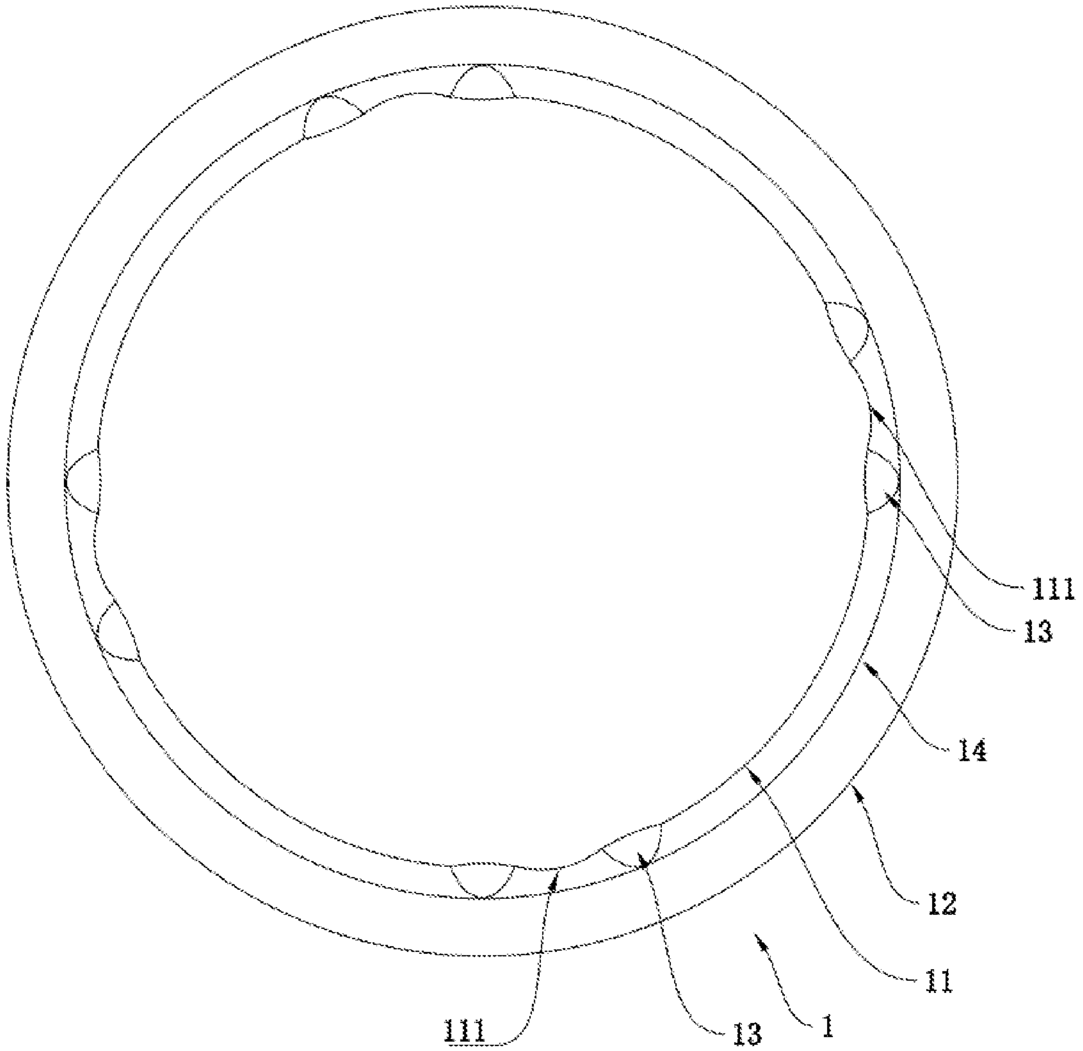
FIG. 2 is a front view of the sealing ring for press-fitting connection structure.

1, sealing ring body;
11, inner curved wall;
111, notch;
12, outer curved wall;
13, convex structure;
14, transition portion.

DESCRIPTION OF THE EMBODIMENTS

For better illustrating and understanding the purpose, features and advantages of the present application, detailed description will be given for the embodiments provided by the present application with reference to the append drawings. It should be understood that these detailed description are only description of exemplary embodiments of the present application, and do not limit the scope of the present application in any way. In the whole specification, the same reference numbers refer to the same components.

In the attached drawings, for the sake of description, the thickness, size, and shape of the object have been slightly exaggerated. The attached drawings are only an example and not strictly drawn to scale.

It should also be understood that the terms “includes/include/including”, “comprises/comprise/comprising”, “has/have/having”, used in this specification indicate the existence of the described features, structure, step, operation, component, and/or member, but do not exclude the existence or addition of one or more other features, structure, step, operation, component, member, and/or their combination.

As shown in FIG. 1 to FIG. 5, the present application discloses a sealing ring for press-fitting connection structure, which includes a sealing ring body 1 being annular-shaped. The sealing ring body 1 includes an inner curved wall 11 and an outer curved wall 12 which are opposite to each other. The sealing ring is mainly installed inside the press-fitting connection structure, which may be a press-fitting joint or a pipe clamp. An end portion of the pipe is inserted into the press-fitting connection structure and then connected by a press-fitting tool. By means of setting the scaling ring body 1 to include opposite inner curved wall 11 and outer curved wall 12, the sealing ring body 1 is attached to an inner wall of the press-fitting connection structure through its outer curved wall 12, and is attached to an outer wall of the pipe through its inner curved wall 11. Under an action of the press-fitting tool, the sealing ring enables the press-fitting connection mechanism to be connected to the pipe tightly.

More specifically, at least one notch 111 is provided on the inner curved wall 11 of the scaling ring body 1. The notch 111 is formed axially on the inner curved wall 11 of the scaling ring body 1, and serves as a gap between the scaling ring and the pipe for fluid to pass through. When the press-fitting connection structure and the pipe are not press-fitted, the fluid will leak through the notch 111 during a detection process, so as to achieve the purpose of warning of leakage, timely remind the testing person and perform press-fitting operation on the press-fitting connection structure at the leakage position, thereby avoiding potential safety hazards in the future. Convex structures 13 are provided on the inner curved wall 11 at two lateral sides of the notch 111. When the press-fitting connection structure is press-fitted with the pipe, the scaling ring deforms under force and fits with the pipe. The convex structures 13 deform under force to fill the notch 111, thereby improving a scaling performance of the scaling ring, resulting in better sealing effect of the press-fitting connection structure after the press-fitting operation.

Figure 3:
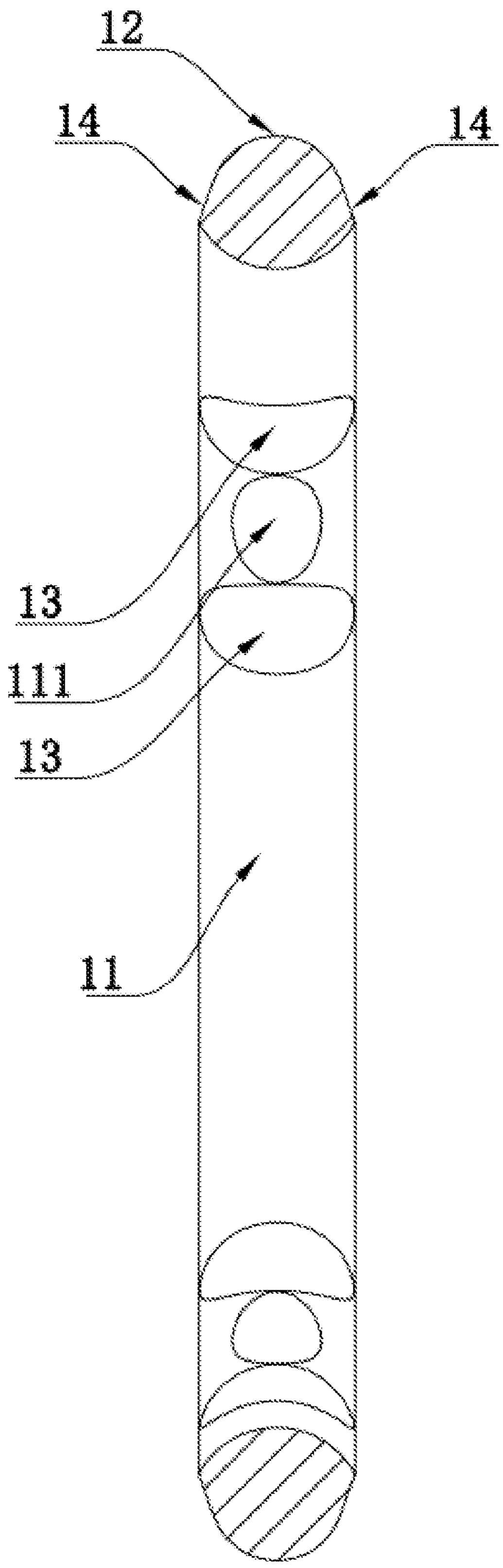
FIG. 3 is a cross sectional view of the sealing ring for press-fitting connection structure.

More specifically, as shown in FIG. 1 and FIG. 3, the inner curved wall 11 and outer curved wall 12 of the sealing ring body 1 are both arc-shaped structures, and the press-fitting connection structure and the pipe are both tubular structures. The sealing ring body 1 fits better with the inner wall of the press-fitting connection structure through the outer curved wall 12 of the curved structures, and fits better with the outer wall of the pipe through the inner curved wall 11 of the curved structures.

Figure 4:
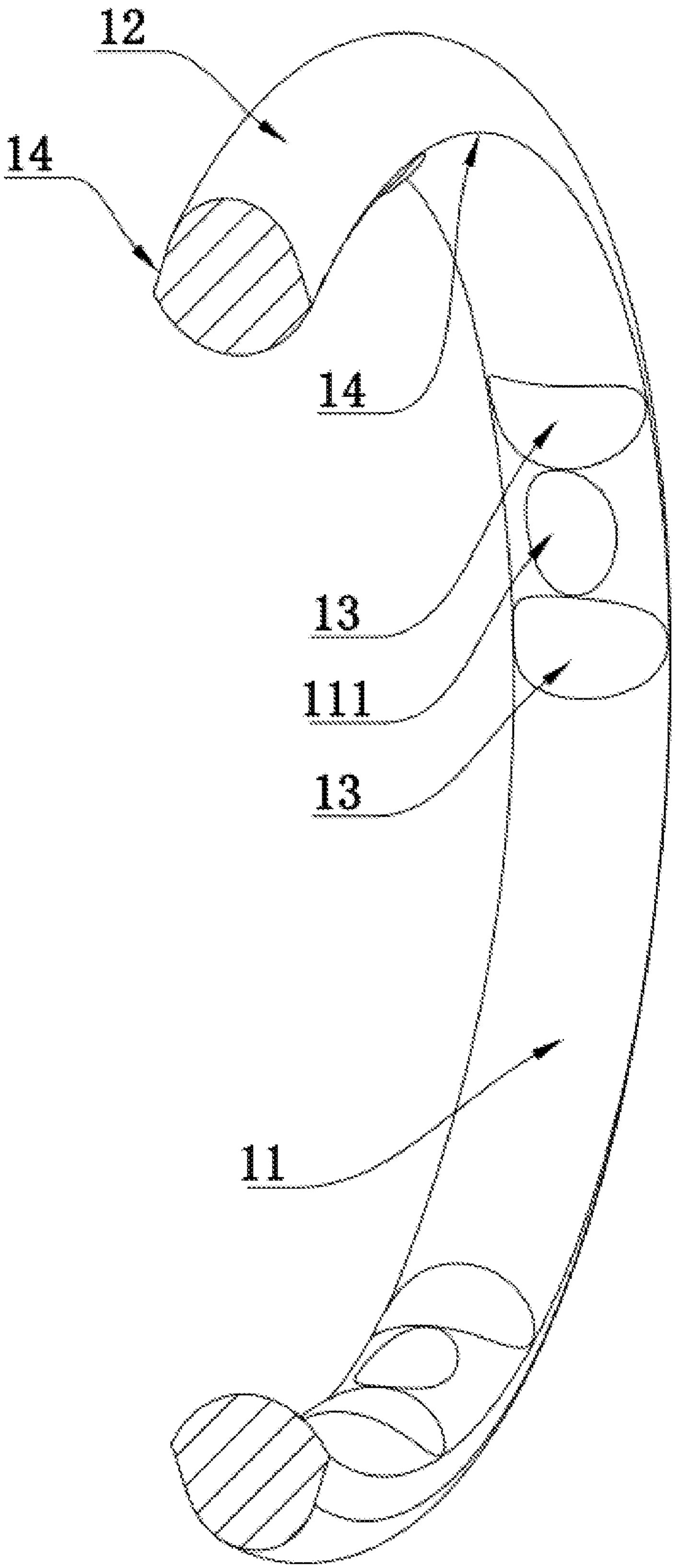
FIG. 4 is another cross sectional view of the sealing ring for press-fitting connection structure.

More specifically, as shown in FIG. 1, FIG. 3, and FIG. 4, the inner curved wall 11 and the outer curved wall 12 are jointed to make a cross-section of the sealing ring body 1 be diamond-shaped, resulting in a larger contact area between the deformed sealing ring and the outer wall of the pipe, finally improving the sealing performance, bearing capacity, and reliability of the sealing ring. It should be noted that this diamond-shaped is incompletely regular diamond. Due to the arc-shaped structures of the inner curved wall 11 and outer curved wall 12, upper and lower ends of the diamond are not pointed but curved, and the diamond formed by the cross-section of the sealing ring body 1 is generally flat.

More specifically, as shown in FIG. 3 and FIG. 4, a transition portion 14 is provided between the inner curved wall 11 and the outer curved wall 12. The inner curved wall 11 is jointed to the outer curved wall 12 through the transition portion 14, so that a contact area of the sealing ring attached to the outer wall of the pipe can be increased through deformation of the transition portion 14 when the sealing ring is subjected to force, which improves the scaling performance, bearing capacity, and reliability of the sealing ring.

More specifically, an embodiment provides a specific construction of the convex structure 13. As shown in FIG. 1, the convex structure 13 is a protrusion set on the inner curved wall 11 of the sealing ring body 1. The protrusion is provided on the inner curved wall 11 of the sealing ring body 1, which makes the outer curved wall 12 of the sealing ring body 1 be a smooth surface. The sealing ring body 1 fits better with the inner wall of the press-fitting connection structure through the smooth outer curved wall 12, resulting in a better sealing effect of the press-fitting connection structure after press-fitting.

Figure 5:
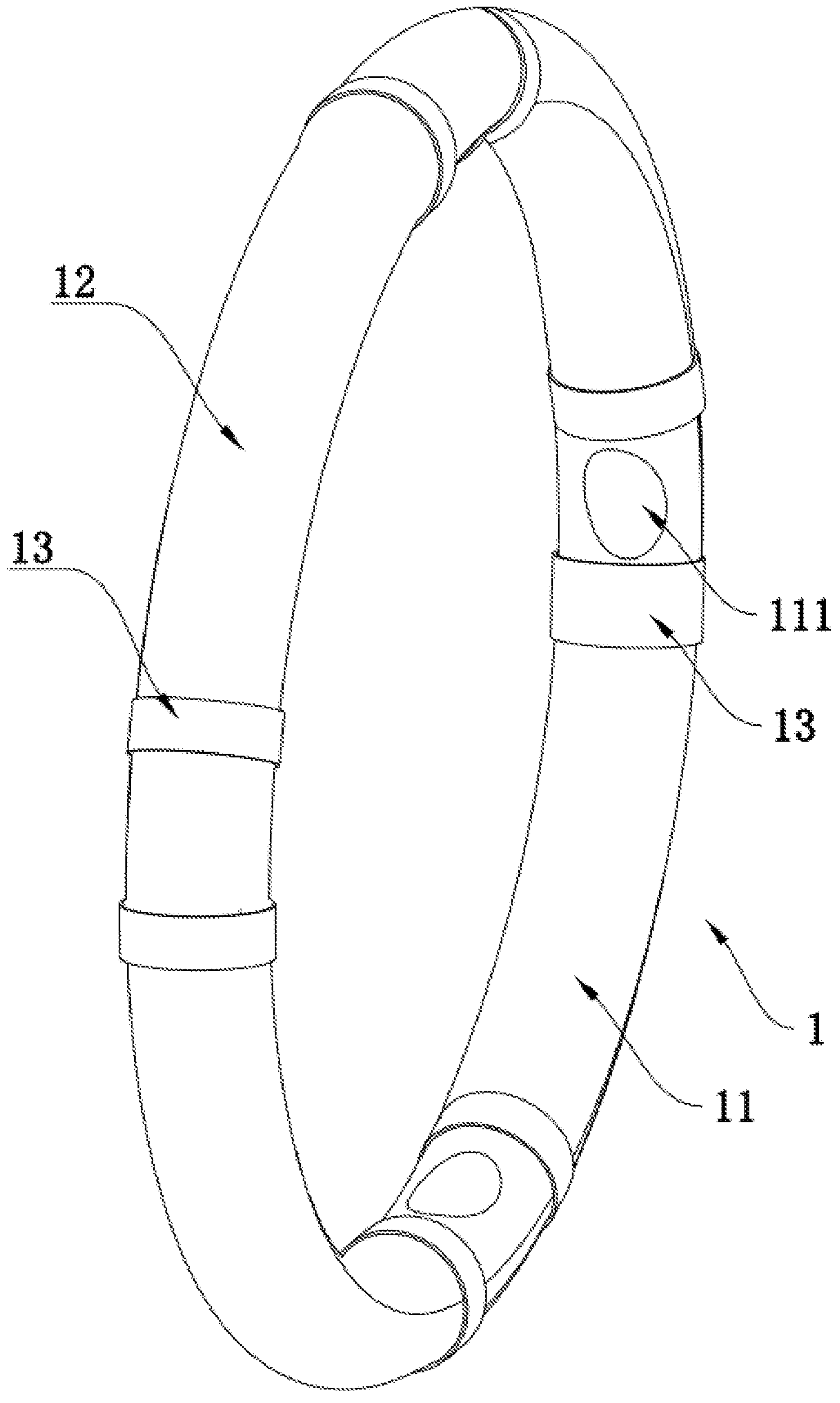
FIG. 5 is schematic view of a sealing ring for press-fitting connection structure provided by another embodiment of this application.

More specifically, an embodiment provides another specific construction of the convex structure 13. As shown in FIG. 5, the convex structure 13 is a convex ring arranged around an outer surface of the sealing ring body 1 along a circumferential direction. By means of setting the convex structure 13 as convex ring on the sealing ring body 1, it is simple in construction and a production cost thereof is low.

More specifically, as shown in FIG. 1, FIG. 3, and FIG. 4, the notch 111 at the inner curved wall 11 of the sealing ring body 1 is elliptical-shaped. The notch 111 is set to be elliptical-shaped to adapt to the outer wall of the pipe, so that the deformed notch 111 fits better with the outer wall of the pipe after press-fitting, which will not affect the sealing performance. In this embodiment, there are four notches 111 and eight convex structures 13. By means of setting four notches 111, the fluid can leak faster from the notch 111 of the press-fitting connection structure without press-fitting during press-fitting detection, so as to timely remind the detection person to perform a press-fitting operation on this press-fitting connection structure. By means of setting eight convex structures 13, they can fill the four notches 111 during press-fitting, improving sealing performance.

As described in this embodiment, the sealing ring for press-fitting connection structure is achieved by setting at least one notch 111 on an inner curved wall 11 of the sealing ring body 1, which serves as a gap between the scaling ring and the pipe for fluid to pass therethrough, achieving the purpose of warning the leakage of the press-fitting connection structure and avoiding potential use hazards in the future. By means of setting the cross section of the sealing ring body 1 in a diamond shape, an area of the deformed sealing ring attached to the outer wall of the pipe is larger, improving the sealing performance, bearing capacity, and reliability of the sealing ring.

This application is not limited to the above performed embodiments, and anyone can derive various other forms of products under the inspiration of this application. However, regardless of any changes in its shape or construction, the technical solution that is the same or similar to this application falls within the protection scope of this application.

What is claimed is:

1. A sealing ring for press-fitting connection structure, comprising a sealing ring body (1) being annular-shaped, wherein the sealing ring body (1) comprises an inner curved wall (11) and an outer curved wall (12), at least one notch (111) being provided on the inner curved wall (11) of the sealing ring body (1), and convex structures (13) being provided on the inner curved wall (11) and located at two opposite sides of each of the at least one notch (111), a notch wall of the at least one notch (111) being curved and concaved from the inner curved wall (11) in a direction towards the outer curved wall (12);

wherein a diameter of the inner curved wall (11) is greater than a diameter of the outer curved wall (12); and wherein two annular and substantially flat transition portions (14) are provided between the inner curved wall (11) and the outer curved wall (12), and the inner curved wall (11) is joined to the outer curved wall (12) through the two annular and substantially flat transition portions (14).

2. The sealing ring for press-fitting connection structure according to claim 1, wherein the inner curved wall (11) and the outer curved wall (12) are joined to make a cross-section of the sealing ring body (1) be diamond-shaped.

3. The sealing ring for press-fitting connection structure according to claim 1, wherein a maximum axial width of the inner curved wall (11) is greater than a maximum axial width of the outer curved wall (12).

4. The sealing ring for press-fitting connection structure according to claim 1, wherein each of the convex structures (13) is a protrusion only set on the inner curved wall (11) of the sealing ring body (1).

5. The sealing ring for press-fitting connection structure according to claim 1, wherein each of the convex structures (13) is a convex ring arranged around the inner curved wall (11) and the outer curved wall (12).

6. The sealing ring for press-fitting connection structure according to claim 1, wherein a boundary line between the notch (111) and the inner curved wall (11) of the sealing ring body (1) is elliptical-shaped.

7. The sealing ring for press-fitting connection structure according to claim 4, wherein the at least one notch (111) includes four notches (111) arranged along a circumferential direction of the sealing ring body (1) and spaced from each other; and the protrusions (13) are eight in number.

8. The sealing ring for press-fitting connection structure according to claim 2, wherein the inner curved wall (11) is a convex wall protruding in a direction towards a central axis of the sealing ring body (1), and the outer curved wall (12) is a convex wall protruding in a direction away from the central axis of the sealing ring body (1); and wherein in the cross-section of the sealing ring body (1), a middle of the inner curved wall (11) and a middle of the outer curved wall (12) act as two vertices of a diamond, respectively, and two joints of the inner curved wall (11) and the outer curved wall (12) act as another two vertices of the diamond.

9. The sealing ring for press-fitting connection structure according to claim 4, wherein a maximum circumferential width of the at least one notch (111) is greater than a maximum axial width of the at least one notch (111).

10. The sealing ring for press-fitting connection structure according to claim 9, wherein the maximum axial width of the at least one notch (111) is less than a maximum axial width of the convex structures (13).

11. The sealing ring for press-fitting connection structure according to claim 10, wherein there are two of the convex structures (13) arranged at two opposite circumferential sides of each notch (111), respectively, and a contour line of each notch (111) is connected to contour lines of the two convex structures (13) arranged at the two opposite circumferential sides thereof.

* * * * *